(12) United States Patent
Li

(10) Patent No.: US 11,923,935 B2
(45) Date of Patent: Mar. 5, 2024

(54) VEHICLE-MOUNTED TELEMATICS BOX (TBOX), ANTENNA REAL-TIME SWITCHING METHOD AND APPARATUS, AND NON-TRANSITORY COMPUTER-READABLE STORAGE MEDIUM

(71) Applicant: ZTE CORPORATION, Shenzhen (CN)

(72) Inventor: Jun Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 471 days.

(21) Appl. No.: 17/274,723

(22) PCT Filed: Sep. 6, 2019

(86) PCT No.: PCT/CN2019/104707
§ 371 (c)(1),
(2) Date: Mar. 9, 2021

(87) PCT Pub. No.: WO2020/052500
PCT Pub. Date: Mar. 19, 2020

(65) Prior Publication Data
US 2023/0268965 A1 Aug. 24, 2023

(30) Foreign Application Priority Data
Sep. 12, 2018 (CN) .......................... 201811059606.7

(51) Int. Cl.
*H04B 7/06* (2006.01)
*H04B 17/10* (2015.01)

(52) U.S. Cl.
CPC ......... *H04B 7/0602* (2013.01); *H04B 17/102* (2015.01); *H04B 17/103* (2015.01)

(58) Field of Classification Search
CPC .. H04B 17/102; H04B 17/103; H04B 7/0602; H04B 7/0802
See application file for complete search history.

(56) References Cited

U.S. PATENT DOCUMENTS

| 6,101,374 A | 8/2000 | Kono |
| 6,118,409 A | 9/2000 | Pietsch et al. |

(Continued)

FOREIGN PATENT DOCUMENTS

| CN | 1159278 A | 9/1997 |
| CN | 101426219 A | 5/2009 |

(Continued)

OTHER PUBLICATIONS

European Patent Office. Extended European Search Report for EP Application No. 19859026.7, dated Sep. 15, 2021, pp. 1-9.

(Continued)

*Primary Examiner* — Hai V Nguyen
(74) *Attorney, Agent, or Firm* — Vivacqua Crane, PLLC

(57) ABSTRACT

A vehicle-mounted TBOX, an antenna real-time switching method and apparatus, and a non-transitory computer-readable storage medium are disclosed. The vehicle-mounted TBOX may include: a MCU control device, an antenna device and a measurement device, where the measurement device is configured to detect an incident wave power and a reflected wave power when the antenna device is in operation, and determine a real-time standing wave ratio at a position where the antenna device locates; the MCU control device is configured to communicate with the antenna device and the measurement device, determine an operation state of the antenna device according to the standing wave ratio, and send a control instruction to the antenna device;

(Continued)

and the antenna device is configured to switch an internal antenna of the antenna device in real time according to the control instruction.

14 Claims, 4 Drawing Sheets

(56) References Cited

U.S. PATENT DOCUMENTS

| | | | | |
|---|---|---|---|---|
| 7,715,463 B2 * | 5/2010 | Li | ........................ | H04B 1/7085 |
| | | | | 375/147 |
| 7,917,175 B2 * | 3/2011 | Song | ....................... | G01R 27/06 |
| | | | | 455/562.1 |
| 9,769,769 B2 * | 9/2017 | Harper | .................... | H04B 7/022 |
| 9,785,174 B2 * | 10/2017 | Khawand | ............. | H04W 52/281 |
| 9,813,997 B2 * | 11/2017 | Mercer | ................. | H04B 1/3838 |
| 9,871,544 B2 * | 1/2018 | Mercer | ................. | H04B 1/3838 |
| 9,871,545 B2 * | 1/2018 | Khawand | ............. | H04B 1/3838 |
| 9,954,564 B2 * | 4/2018 | Little | ....................... | H04B 1/401 |
| 10,013,038 B2 * | 7/2018 | Mercer | ................. | H04B 1/3838 |
| 10,044,095 B2 * | 8/2018 | Mercer | ..................... | H01Q 1/24 |
| 10,224,974 B2 * | 3/2019 | Mercer | ................. | H04B 17/102 |
| 10,425,176 B2 * | 9/2019 | Hamada | ................. | H04W 64/00 |
| 10,461,406 B2 * | 10/2019 | Harper | .................... | H01Q 7/005 |
| 10,893,488 B2 * | 1/2021 | Khawand | ............. | H04W 52/367 |
| 11,027,701 B2 * | 6/2021 | Sanji | ........................ | G01S 5/012 |
| 2017/0070246 A1 | 3/2017 | Natesan et al. | | |
| 2017/0230066 A1 * | 8/2017 | Little | ..................... | H04B 1/401 |

FOREIGN PATENT DOCUMENTS

| | | | |
|---|---|---|---|
| CN | 101742739 | A | 6/2010 |
| CN | 102571217 | A | 7/2012 |
| CN | 202383204 | U | 8/2012 |
| CN | 205377885 | U | 7/2016 |
| CN | 107402330 | A | 11/2017 |
| CN | 207457354 | U | 6/2018 |
| WO | WO-2005069664 A1 * | | 7/2005 ............. G01R 27/06 |

OTHER PUBLICATIONS

China National Intellectual Property Administration. Search report for CN Application No. 2018110596067 and English translation, dated Oct. 28, 2021, pp. 1-5.

China National Intellectual Property Administration. Notice of First Office Action for CN Application No. 2018110596067 and English translation, dated Nov. 3, 2021, pp. 1-11.

International Search Report and Written Opinion for the International Patent Application No. PCT/CN2019/104707 dated Nov. 10, 2019.

\* cited by examiner

VEHICLE-MOUNTED TELEMATICS BOX (TBOX), ANTENNA REAL-TIME SWITCHING METHOD AND APPARATUS, AND NON-TRANSITORY COMPUTER-READABLE STORAGE MEDIUM

CROSS-REFERENCE TO RELATED APPLICATION

This application is a national stage filing under 35 U.S.C. § 371 of international application number PCT/CN2019/104707, filed Sep. 6, 2019, which claims priority to Chinese patent application No. 201811059606.7, filed Sep. 12, 2018. The contents of these applications are incorporated herein by reference in their entirety.

TECHNICAL FIELD

The present disclosure relates to, but is not limited to, the field of vehicle-mounted terminals.

BACKGROUND

A vehicle-mounted Telematics BOX (TBOX) can read bus data and private protocol of a vehicle Controller Area Network (CAN). The TBOX can transmit data to a cloud server through the network, to provide information such as vehicle condition reports, driving records, fuel consumption statistics, fault reminders, traffic violation queries, driving behaviors, positions and tracks to a mobile phone APP. Moreover, the TBOX can also remotely start the vehicle, turn on an air conditioner, and adjust a seat using the mobile phone APP through the network.

Therefore, a Wireless Wide Area Network (WWAN) wireless communication module in the vehicle-mounted TBOX is required to have good antenna performance and high reliability. The damage or abnormal connection of an antenna at any time may affect the normal operation of the whole communication system, and even damage a link of a radio-frequency front-end transceiver.

SUMMARY

In accordance with one aspect of the present disclosure, there is provided a vehicle-mounted Telematics BOX (TBOX), including: a Microcontroller Unit (MCU) control device, an antenna device and a measurement device. The measurement device is configured to detect an incident wave power and a reflected wave power when the antenna device is in operation, and determine a real-time standing wave ratio at a position where the antenna device locates; the MCU control device is configured to communicate with the antenna device and the measurement device, determine an operation state of the antenna device according to the standing wave ratio, and send a control instruction to the antenna device; and the antenna device is configured to switch an internal antenna of the antenna device in real time according to the control instruction.

In accordance with another aspect of the present disclosure, there is provided a real-time antenna switching method for the vehicle-mounted Telematics BOX (TBOX), applied to the vehicle-mounted TBOX, including: detecting an incident wave power and a reflected wave power when the antenna device is in operation, and determining a real-time standing wave ratio at a position where the antenna device locates; determining an actual operation state of the antenna device according to the standing wave ratio, and sending a control instruction to the antenna device to switch an internal antenna in real time; and switching an internal antenna of the antenna device in real time, by the antenna device, according to the control instruction.

In accordance with another aspect of the present disclosure, there is provided a vehicle-mounted Telematics BOX (TBOX) apparatus, including: a memory, a processor, and a computer program stored in the memory and executable by the processor. The computer program, when executed by the processor, cause the processor to perform the antenna real-time switching method for the vehicle-mounted TBOX according to the embodiments of the present disclosure.

In accordance with another aspect of the present disclosure, there is provided a non-transitory computer-readable storage medium storing a program of an antenna real-time switching method for a vehicle-mounted Telematics BOX (TBOX), which, when executed by a processor, cause the processor to perform the antenna real-time switching method for the vehicle-mounted TBOX according to the embodiments of the present disclosure.

The implementation, functional features and advantages of the present disclosure will be described with reference to the accompanying drawings in conjunction with embodiments.

DETAILED DESCRIPTION

Figure 1:
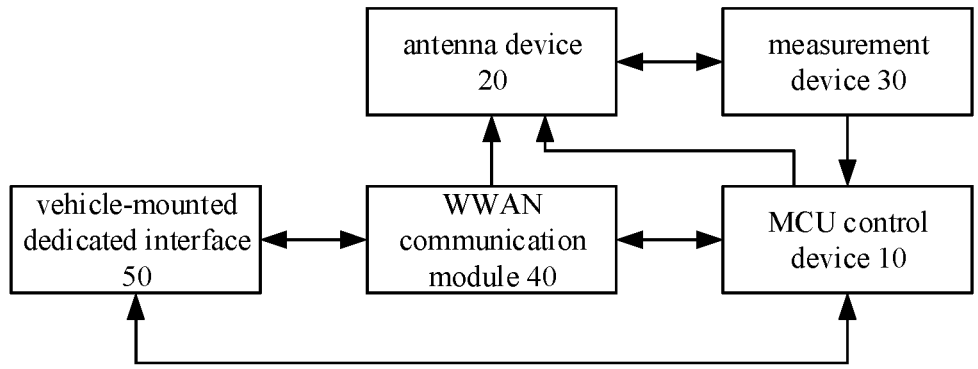
FIG. 1 is a structural schematic diagram of a vehicle-mounted TBOX provided by an embodiment of the present disclosure.

In order to make the technical problems to be solved by the present disclosure, technical schemes and beneficial effects clear and understandable, the present disclosure will be described in detail below with reference to the accompanying drawings and embodiments. It should be understood that the embodiments described herein are merely used to explain the disclosure and are not intended to limit the disclosure.

In a vehicle-mounted TBOX, the antenna damage or abnormal connection may affect the normal operation of the whole communication system of the vehicle-mounted TBOX. In order to ensure the normal operation of an antenna system of the vehicle-mounted TBOX, there is a need to detect the antenna system of the vehicle-mounted TBOX. The following schemes can be adopted to detect whether the antenna system of the vehicle-mounted TBOX operates normally.

For example, a voltage dividing resistor is connected to a to-be-detected point in parallel and connected to the ground, thus a connection state at the to-be-detected point can be judged by detecting a DC voltage value. By means of this detection scheme, only a previous connection state of a detection resistor can be judged, an actual operation state of an antenna cannot be judged. Thus, there is a possibility that the antenna end is damaged and cannot radiate electromagnetic waves normally, however the connection state of the detection resistor is still normal and the voltage detected by the detection resistor is still normal. Therefore, a detection system cannot actually judge whether the operation state of the antenna is normal and whether a return loss of an RF link is normal.

For another example, a bidirectional coupler is used to detect a reflected wave power to judge whether an antenna is abnormal. By means of this detection scheme, a reflected wave signal can be detected by the bidirectional coupler only when a control system issues an antenna reflected wave detection instruction, that is, real-time detection cannot be realized, and a communication system cannot operate when a detection of reflected wave is being performed.

In view of this, the present disclosure provides a vehicle-mounted TBOX and antenna switching method and apparatus for the vehicle-mounted TBOX, and a non-transitory computer-readable storage medium. An incident wave power and a reflected wave power when an antenna device operates are detected and a standing wave ratio is determined, to monitor a real-time standing wave ratio, so that switching to a second antenna can be performed in time when a first antenna is abnormal, thereby ensuring that the function of a communication system of the vehicle-mounted TBOX is not affected in real time, enhancing the performance and realizing higher reliability of an antenna system, and avoiding permanent damage of a radio-frequency link device caused by total power reflection.

In subsequent descriptions, suffixes that used to represent an element, such as "module", "component" or "unit" are only for illustration of the present disclosure, which has no particular significance. Thus, "module", "component" and "unit" can be mixed in use.

It should be noted that the terms "first", "second" and the like used in the description, claims and drawings of the present disclosure are used to distinguish similar objects, but not necessarily describe a particular order or sequence.

Figure 2:
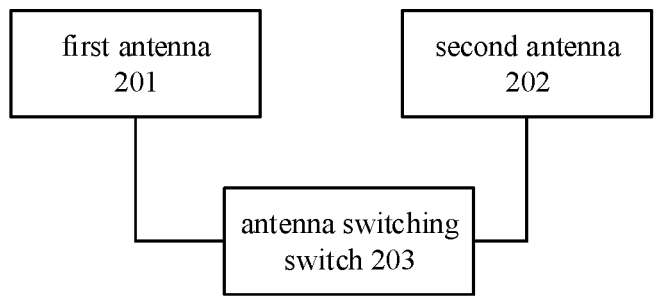
FIG. 2 is a structural schematic diagram of an antenna device provided by an embodiment of the present disclosure.
Figure 3:
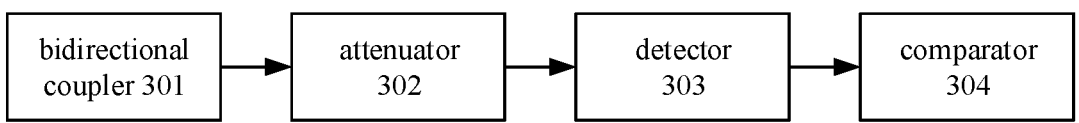
FIG. 3 is a structural schematic diagram of a measurement device provided by an embodiment of the present disclosure.

Referring to FIG. 1-FIG. 3, embodiments of the present disclosure provide a vehicle-mounted TBOX capable of switching an antenna in real time. The vehicle-mounted TBOX includes a Microcontroller Unit (MCU) control device 10, an antenna device 20 and a measurement device 30.

The measurement device 30 is configured to detect an incident wave power and a reflected wave power when the antenna device is in operation, and determine a real-time standing wave ratio at the position where the antenna device locates.

The MCU control device 10 is configured to communicate with the antenna device 20 and the measurement device 30, determine an actual operation state of the antenna device according to the standing wave ratio, and send a control instruction to the antenna device 20, to implement real-time switching of an internal antenna.

The antenna device 20 includes at least two antennas, the antennas being configured to radiate and receive a signal, and the antenna device 20 switches an internal antenna of the antenna device 20 in real time according to the control instruction of the MCU control device 10 to ensure the normal communication of the vehicle-mounted TBOX.

In one embodiment of the present disclosure, the measurement device 30 includes a bidirectional coupler 301, an attenuator 302, a detector 303 and a comparator 304, as shown in FIG. 3.

The bidirectional coupler 301 is configured to receive an incident wave power and a reflected wave power when the antenna device 20 operates.

The attenuator 302 is configured to attenuate the incident wave power and reflected wave power received by the bidirectional coupler 301 to obtain an attenuated incident wave signal and reflected wave signal which are input to the detector 303.

The detector 303 is configured to detect the attenuated incident wave signal and reflected wave signal, and output detection voltages including a forward detection output voltage and a reverse detection output voltage, the output detection voltages being linearly related to the input level of the detector.

The comparator 304 is configured to perform subtraction on the output detection voltages of the detector 303 including a forward detection output voltage and a reverse detection output voltage to obtain a difference between the forward detection output voltage and the reverse detection output voltage, the difference being used to determine the real-time standing wave ratio according to a function relationship between the difference and a reflection coefficient and a function relationship between the reflection coefficient and the standing wave ratio.

In one embodiment, the MCU control device 10 is configured to determine an actual operation state of the antenna device according to the standing wave ratio and send a control instruction to the antenna device to implement real-time switching of an internal antenna through the following operations: determining an actual operation state of the antenna device according to the standing wave ratio, if the standing wave ratio is greater than a preset threshold (for example, 3), judging that the antenna device 20 operates abnormally, for example, there is a situation of open-circuited or short-circuited, and sending a control instruction to the antenna device 20 to implement real-time switching of an internal antenna; and if the standing wave ratio is less than the preset threshold (for example, 3), judging that the antenna device operates normally, and sending a control instruction to the antenna device 20 for not switching an internal antenna.

In one embodiment, the antenna device 20 includes a first antenna 201, a second antenna 202 and an antenna switching switch 203, as shown in FIG. 2.

The first antenna 201 and the second antenna 202 are configured to radiate and receive signals. The first antenna 201 is a default antenna of the vehicle-mounted TBOX, and the second antenna 202 is a standby antenna. When the first antenna 201 operates abnormally, the first antenna is automatically switched to the second antenna 202, to ensure the normal communication of the vehicle-mounted TBOX.

The antenna switching switch 203 is configured to control the switching between the first antenna 201 and the second antenna 202 according to the control instruction of the MCU control device 10. The first antenna is automatically switched to the second antenna 202 when the first antenna 201 operates abnormally, to ensure the normal communication of the vehicle-mounted TBOX, and no switching is performed when the first antenna 201 operates normally.

In one embodiment, the vehicle-mounted TBOX further includes a vehicle-mounted dedicated interface 50, interconnection and communication of the vehicle-mounted dedicated interface 50 including interconnection and communication with automobile batteries, igniters, microphones, speakers, keys, indicator lights, Controller Area Network (CAN) data signals and the like. In one embodiment, the vehicle-mounted dedicated interface 50 is a 40-pin vehicle-mounted dedicated interface.

In one embodiment, the vehicle-mounted TBOX further includes a Wireless Wide Area Network (WWAN) communication module 40. The WWAN communication module 40 is connected with the antenna device 20, the MCU control device 10 and the vehicle-mounted dedicated interface 50, and is used for wireless communication of the vehicle-mounted TBOX. In one embodiment, the WWAN communication module 40 is connected with the first antenna 201 and the second antenna 202 through the antenna switching switch 203 to implement a wireless communication function.

Embodiments of the present disclosure provide a vehicle-mounted TBOX capable of switching an antenna in real time. A real-time standing wave ratio is monitored by detecting an incident wave power and a reflected wave power by a measurement device and calculating and determining a standing wave ratio. That is, an incident wave power and a reflected wave power when a first antenna operates are detected by a bidirectional coupler, a real-time standing wave ratio of a WWAN communication module at the first antenna is determined by an attenuator, a detector and a comparator, whether the first antenna operates abnormally is judged by an MCU control device through the standing wave ratio and a preset threshold. If the standing wave ratio is greater than the preset threshold, it is judged that the first antenna operates abnormally, for example, the first antenna is open-circuited or short-circuited, and an antenna switching switch (SP2T switch) is controlled by the MCU control device to switch from the first antenna to a second antenna in time. By means of the above scheme, the function of the communication system of the vehicle-mounted TBOX can be sustained in real time without being affected by antenna damage, the performance and reliability of the antenna system can be enhanced, and permanent damage of a radio-frequency link device caused by total power reflection due to abnormality of the first antenna can be avoided.

Figure 4:
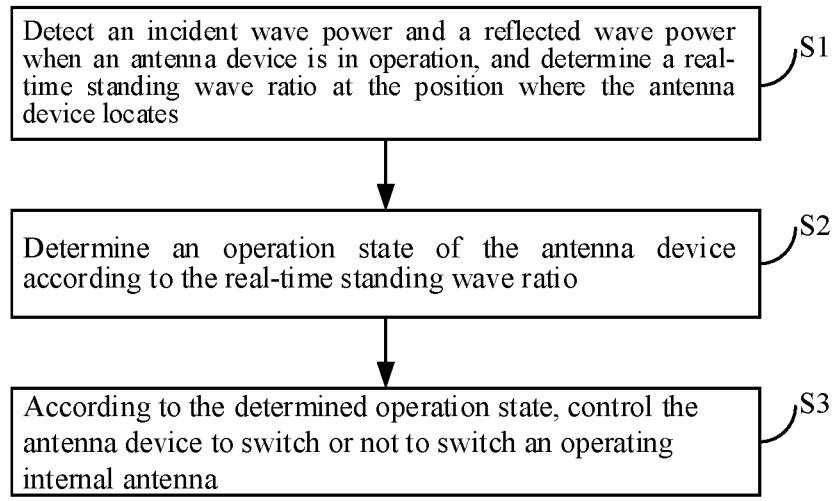
FIG. 4 is a flow chart of an antenna real-time switching method for a vehicle-mounted TBOX provided by an embodiment of the present disclosure.

Referring to FIG. 4, embodiments of the present disclosure provide an antenna real-time switching method for a vehicle-mounted TBOX. The method includes steps S1-S3.

In a step of S1, an incident wave power and a reflected wave power are detected when an antenna device is in operation, and a real-time standing wave ratio at the position where the antenna device locates is determined.

In a step of S2, an actual operation state of the antenna device is determined according to the standing wave ratio, and a control instruction is sent to the antenna device to switch an internal antenna in real time.

In a step of S3, the antenna device switches an internal antenna of the antenna device in real time according to the control instruction, to ensure the normal communication of the vehicle-mounted TBOX.

In one embodiment, the step S1 includes: receiving an incident wave power and a reflected wave power when the antenna device is in operation; attenuating the received incident wave power and reflected wave power to obtain an attenuated incident wave signal and reflected wave signal; detecting the attenuated incident wave signal and reflected wave signal, and outputting output detection voltages including a forward detection output voltage and a reverse detection output voltage; performing subtraction on the output detection voltages including a forward detection output voltage and a reverse detection output voltage to obtain a difference between the forward detection output voltage and the reverse detection output voltage; and according to the difference, determining a real-time standing wave ratio according to a function relationship between the difference and a reflection coefficient and a function relationship between the reflection coefficient and the standing wave ratio.

In one embodiment, the step S2 includes: determining an actual operation state of the antenna device according to the standing wave ratio, if the standing wave ratio is greater than a preset threshold, judging that the antenna device operates abnormally, for example, due to open-circuited or short-circuited, and sending a control instruction to the antenna device to switch an internal antenna in real time; and if the standing wave ratio is less than the preset threshold, judging that the antenna device operates normally, and sending a control instruction to the antenna device for not switching an internal antenna.

It should be noted that the method embodiment belongs to the same concept as the device embodiment, the implementation process is detailed in the device embodiment, and the technical features in the device embodiment are correspondingly applicable to the method embodiment, which will not be repeated here.

The technical scheme of the present disclosure will be further described below in detail in combination with the embodiments.

Figure 5:
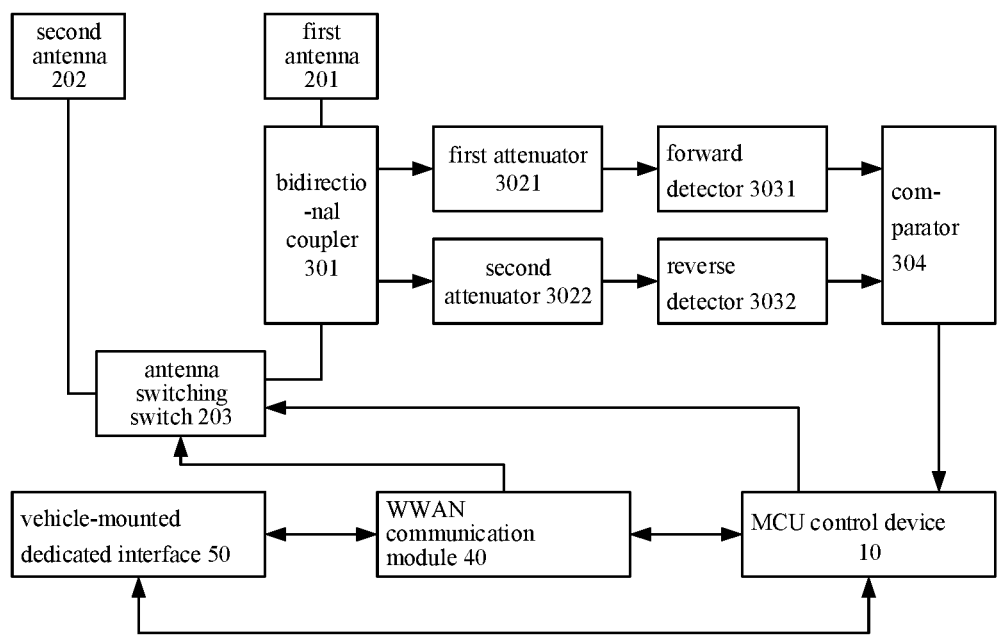
FIG. 5 is a structural schematic diagram of a vehicle-mounted TBOX provided by an embodiment of the present disclosure.

Referring to FIG. 5, embodiments of the present disclosure provide a vehicle-mounted TBOX capable of switching an antenna in real time. The vehicle-mounted TBOX includes an MCU control device 10, an antenna device 20, a measurement device 30, a WWAN communication module 40 and a vehicle-mounted dedicated interface 50.

In some embodiments of the present disclosure, the antenna device 20 includes a first antenna 201, a second antenna 202, and an antenna switching switch 203. The measurement device 30 includes a bidirectional coupler 301, an attenuator 302, a detector 303 and a comparator 304.

The WWAN communication module 40 is connected with the antenna switching switch 203, the MCU control device 10 and the vehicle-mounted dedicated interface 50, and is used for wireless communication of the vehicle-mounted TBOX. The WWAN module 40 can implement the wireless communication function through the first antenna 201 and the second antenna 202 respectively. In some embodiments of the present disclosure, the first antenna 201 is a default antenna of the vehicle-mounted TBOX, the second antenna 202 is a standby antenna, and the WWAN module 40 implements the wireless communication function by default through the first antenna 201.

The vehicle-mounted dedicated interface 50 is configured for interconnection and communication, including interconnection and communication with automobile batteries, igniters, microphones, speakers, keys, indicator lights, Controller Area Network (CAN) data signals and the like. In one embodiment, the vehicle-mounted dedicated interface 50 is a 40-pin vehicle-mounted dedicated interface.

The measurement device 30 is configured to detect an incident wave power and a reflected wave power when an antenna device is in operation, and determine a real-time standing wave ratio at the position where the antenna device locates. The measurement device 30 includes a bidirectional coupler 301, an attenuator 302, a detector 303 and a comparator 304.

The bidirectional coupler 301 is configured to receive an incident wave power and a reflected wave power of the WWAN communication module 40 when the first antenna 201 operates.

The attenuator 302 is configured to attenuate the incident wave power and reflected wave power received by the bidirectional coupler 301 to obtain an attenuated incident wave signal and reflected wave signal which are input to the detector 303. In some embodiments of the present disclosure, the attenuator 302 includes a first attenuator 3021 and a second attenuator 3022. The first attenuator 3021 attenuates the received incident wave power to obtain an attenuated incident wave signal. The second attenuator 3022 attenuates the received reflected wave power to obtain an attenuated reflected wave signal.

The detector 303 is configured to detect the attenuated incident wave signal and reflected wave signal, and output detection voltages including a forward detection output voltage and a reverse detection output voltage, the output detection voltages being linearly related to the input level of the detector. In some embodiments of the present disclosure, the detector 303 includes a forward detector 3031 and a reverse detector 3032. The forward detector 3031 detects the incident wave signal attenuated by the first attenuator 3021 and outputs a forward detection output voltage. The reverse detector 3032 detects the reflected wave signal attenuated by the second attenuator 3022 and outputs a reverse detection output voltage.

The comparator 304 is configured to perform subtraction on the forward detection output voltage output by the forward detector 3031 and the reverse detection output voltage output by the reverse detector 3032 to obtain a difference between the forward detection output voltage and the reverse detection output voltage, the difference being used to determining the real-time standing wave ratio according to a function relationship between the difference and a reflection coefficient and a function relationship between the reflection coefficient and the standing wave ratio.

In some embodiments of the present disclosure, the detector 303 (including a forward detector 3031 and a reverse detector 3032) adopts a detection mode of a logarithmic amplifier, so the function relationship between the output voltage and a reflection system is as follows:

$$\Delta V = 0.51 g \frac{10^{\frac{D}{10}} + \Gamma^2}{10^{\frac{D}{10}*\Gamma^2} + 1}$$

where D represents a directivity of the bidirectional coupler, $\Gamma$ represents a reflection coefficient, and $\Delta V$ represents a difference between the forward detection output voltage and the reverse detection output voltage.

The function relationship between the reflection coefficient $\Gamma$ and the standing wave ratio (VSWR) is:

$$VSWR = \frac{1 + |\Gamma|}{1 - |\Gamma|}$$

It can be seen from the above function relationship that the coupling degree of the bidirectional coupler has no influence on the difference between the forward detector 3031 and the reverse detector 3032.

In another embodiment, the detector can also detect the incident wave power signal and the reflected wave power signal by adopting a detection mode using discrete diode component or a detection mode using a Root Mean Square to DC (RMS-DC) converter.

The MCU control device 10 is configured to access CAN data and communicate with the antenna switching switch 203 and the comparator 304 through the following operations: determining an actual operation state of the first antenna 201 according to the standing wave ratio determined by the comparator 304, and sending a control instruction to the antenna switching switch 203 to switch an internal antenna in real time. If the standing wave ratio is greater than a preset threshold (for example, 3), which means the first antenna 201 operates abnormally, the MCU control device 10 sends a control instruction to the antenna switching switch 203 through a General Purpose Input Output (GPIO) to switch the first antenna 201 to the second antenna 202; and if the standing wave ratio is less than the preset threshold, which means the first antenna 201 operates normally, the MCU control device 10 sends a control instruction to the antenna switching switch 203 through the GPIO so as to not switch.

The antenna device 20 is configured to radiate and receive a signal, and switch an internal antenna in real time of the antenna device 20 according to the control instruction of the MCU control device 10, so as to ensure normal communication of the vehicle-mounted TBOX. The antenna device 20 includes a first antenna 201, a second antenna 202 and an antenna switching switch 203.

The first antenna 201 and the second antenna 202 are configured to radiate and receive signals, and are connected with the WWAN module 40 through the antenna switching switch 203 to implement the wireless communication function. That is, the WWAN module 40 can implement the wireless communication function through the first antenna 201 and the second antenna 202 respectively.

The antenna switching switch 203 is configured to control the switching between the first antenna 201 and the second antenna 202 according to the control instruction of the MCU control device 10. When the first antenna 201 operates abnormally, the first antenna 201 is switched to the second antenna 202 to ensure the normal communication of vehicle-mounted TBOX. No switching is performed when the first antenna 201 operates normally, and the first antenna 201 is maintained as a default antenna to implement wireless communication with the WWAN communication module 40.

Embodiments of the present disclosure provide a vehicle-mounted TBOX capable of switching an antenna in real time. An incident wave power and a reflected wave power when a first antenna operates are detected by a bidirectional coupler. A real-time standing wave ratio of a WWAN communication module at the first antenna is determined by an attenuator, a detector and a comparator. Whether the first antenna operates abnormally is judged by an MCU control device through the standing wave ratio and a preset threshold. If the standing wave ratio is greater than the preset threshold, it is judged that the first antenna operates abnormally, for example, the first antenna is open-circuited or short-circuited, and an antenna switching switch (SP2T switch) is controlled by the MCU control device to switch from the first antenna to a second antenna in time. By means of the above scheme, the function of the communication system of the vehicle-mounted TBOX can be sustained in real time without being affected by antenna damage, the performance and reliability of the antenna system can be enhanced, and permanent damage of a radio-frequency link device caused by total power reflection due to abnormality of the first antenna can be avoided.

Figure 6:
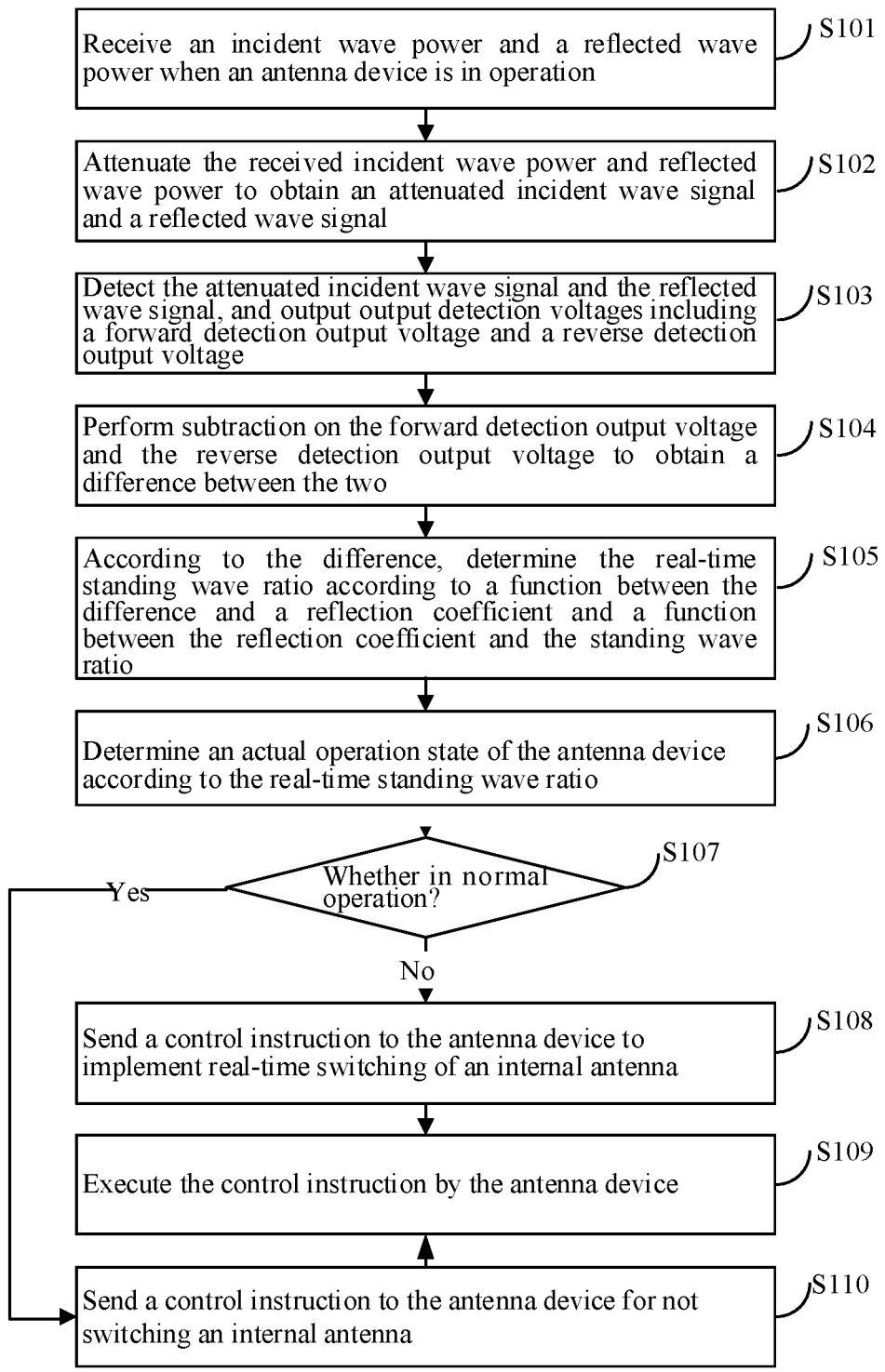
FIG. 6 is a flow chart of an antenna real-time switching method for a vehicle-mounted TBOX provided by an embodiment of the present disclosure.

Referring to FIG. 6, embodiments of the present disclosure provide an antenna real-time switching method for a vehicle-mounted TBOX. The method includes the following steps S101-S110.

In a step of S101, when an antenna device is in operation, an incident wave power and a reflected wave power are received.

In a step of S102, the received incident wave power and reflected wave power are attenuated to obtain an attenuated incident wave signal and reflected wave signal.

In a step of S103, the attenuated incident wave signal and reflected wave signal are detected, output detection voltages including a forward detection output voltage and a reverse detection output voltage are output.

In a step of S104, subtraction is performed on the output detection voltages including a forward detection output voltage and a reverse detection output voltage to obtain a difference between the forward detection output voltage and the reverse detection output voltage, the difference being used to determine a real-time standing wave ratio.

In a step of S105, according to the difference, the real-time standing wave ratio is determined according to a function relationship between the difference and a reflection coefficient and a function relationship between the reflection coefficient and the standing wave ratio.

In a step of S106, an actual operation state of the antenna device is determined according to the standing wave ratio.

In a step of S107, it is judged whether the antenna device operates normally, if the antenna device operates normally, proceed to step S108; otherwise, proceed to step S109.

In a step of S108, a control instruction is sent to the antenna device to switch an internal antenna in real time.

In a step of S109, a control instruction is sent to the antenna device for not switching an internal antenna.

In a step of S110, the antenna device executes the control instruction.

Embodiments of the present disclosure provide an antenna real-time switching method for a vehicle-mounted TBOX. An incident wave power and a reflected wave power when a first antenna operates are detected, and a real-time standing wave ratio at the first antenna is determined by an attenuator, a detector and a comparator. Whether the first antenna operates abnormally is judged through the standing wave ratio and a preset threshold. If the standing wave ratio is greater than the preset threshold, the first antenna operates abnormally, for example, the first antenna is open-circuited or short-circuited, and the antenna switch is controlled to switch from the first antenna to the second antenna in time. By means of the above scheme, the function of the communication system of the vehicle-mounted TBOX can be sustained in real time without being affected by antenna damage, the performance and reliability of the antenna system can be enhanced, and permanent damage of a radio-frequency link device caused by total power reflection due to abnormality of the first antenna can be avoided.

Figure 7:
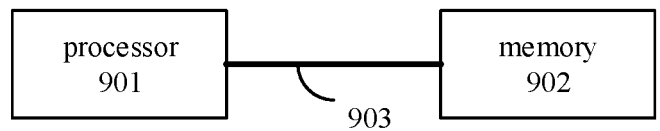
FIG. 7 is a structural schematic diagram of a vehicle-mounted TBOX apparatus provided by an embodiment of the present disclosure.

In addition, embodiments of the present disclosure further provide a vehicle-mounted TBOX apparatus. As shown in FIG. 7, the vehicle-mounted TBOX apparatus 900 includes a memory 902, a processor 901 and one or more computer programs stored in the memory 902 and executable by the processor 901. The memory 902 and the processor 901 are coupled together by a bus system 903. When executing the one or more computer programs, the processor 901 is caused to implement the following steps of S1-S3 of the antenna real-time switching method for the vehicle-mounted TBOX provided by embodiments of the present disclosure.

In a step of S1, an incident wave power and a reflected wave power are detected when an antenna device is in operation, and a real-time standing wave ratio at the position where the antenna device locates is determined.

In a step of S2, an actual operation state of the antenna device is determined according to the standing wave ratio, and a control instruction is sent to the antenna device to switch an internal antenna in real time.

In a step of S3, the antenna device switches an internal antenna of the antenna device in real time according to the control instruction, to ensure normal communication of the vehicle-mounted TBOX.

The methods disclosed in the embodiments of the present disclosure described above, in some embodiments, are applied to, or implemented by, the processor 901. The processor 901 is, in some embodiments, a chip of integrated circuit having signal processing capabilities. In implementation, the steps of the above method are, in some embodiments, accomplished by integrated logic circuitry of the hardware in the processor 901 or instructions in the form of software. The processor 901 is, in some embodiments, a general purpose processor, a DSP, or other programmable logic device, a discrete gate or transistor logic device, a discrete hardware component, or the like. The processor 901, in some embodiments, implement or perform the methods, steps, and logical block diagrams disclosed in embodiments of the present disclosure. The general purpose processor is, in some embodiments, a microprocessor or any conventional processor or the like. The steps of the method disclosed by the embodiments of the present disclosure are, in some embodiments, directly performed by a hardware decoding processor or performed by a combination of hardware and software modules in the decoding processor. The software module is, in some embodiments, located in a non-transitory computer-readable storage medium located in the memory 902, and the processor 901 reads information in the memory 902 and completes the steps of a foregoing method in combination with hardware of the processor 901.

It will be understood that the memory 902 of the embodiments of the present disclosure is, in some embodiments, a volatile memory or anon-volatile memory, or include both a volatile memory and a non-volatile memory. The non-volatile memory is, in some embodiments, Read-Only Memory (ROM), Programmable Read-Only Memory (PROM), Erasable Programmable Read-Only Memory (EPROM), Electrically Erasable Programmable Read-Only Memory (EEPROM), Ferromagnetic Random Access Memory (FRAM), Flash Memory or other memory technologies, Compact Disk Read-Only Memory (CD-ROM), a Digital Versatile Disk (DVD) or other optical disk storage, magnetic cassette, magnetic tape, magnetic disk storage or other magnetic storage devices. The volatile memory is, in some embodiments, Random Access Memory (RAM), and by way of example but not limitation, RAMs in a variety of forms can be used, such as Static Random Access Memory (SRAM), Synchronous Static Random Access Memory (SSRAM), Dynamic Random Access Memory (DRAM), Synchronous Dynamic Random Access Memory (SDRAM), Double Data Rate Synchronous Dynamic Random Access Memory (DDRSDRAM), Enhanced Synchronous Dynamic Random Access Memory (ESDRAM), SyncLink Dynamic Random Access Memory (SLDRAM), Direct Rambus Random Access Memory (DRRAM). The memories described in the embodiments of the present disclosure are intended to include, but are not limited to, these and any other suitable types of memories.

It should be noted that the vehicle-mounted TBOX apparatus embodiments belong to a same concept as the method embodiments, specific implementation processes ares detailed in the method embodiments, and the technical features in the method embodiments are correspondingly applicable to the vehicle-mounted TBOX apparatus embodiments, which will not be repeated here.

In addition, in an exemplary embodiment, the present disclosure further provides a computer storage medium, in some embodiments, a non-transitory computer-readable storage medium, including a memory 902 storing computer programs. The non-transitory computer-readable storage medium stores one or more programs of the antenna real-time switching method for the vehicle-mounted TBOX which, when executed by a processor 901, cause the processor 901 to implement the following steps of S1-S3 of the antenna real-time switching method for the vehicle-mounted TBOX provided by embodiments of the present disclosure.

In a step of S1, an incident wave power and a reflected wave power are detected when an antenna device is in operation, and a real-time standing wave ratio at the position where the antenna device locates is determined.

In a step of S2, an actual operation state of the antenna device is determined according to the standing wave ratio, and a control instruction is sent to the antenna device to switch an internal antenna in real time.

In a Step of S3, the antenna device switches an internal antenna of the antenna device in real time according to the control instruction, to ensure normal communication of the vehicle-mounted TBOX.

It should be noted that the non-transitory computer-readable storage medium embodiment, on which the vehicle-mounted TBOX antenna real-time switching method is performed via a program, belongs to the same concept as the method embodiment, the specific implementation process is detailed in the method embodiment, and the technical features in the method embodiment are correspondingly applicable to the non-transitory computer-readable storage medium embodiment, which will not be repeated here.

It should be noted that, in the present disclosure, the terms "include", "comprise", "contain" or any other variant thereof are intended to cover non-exclusive inclusions such that a process, method, article or device that includes a series of elements includes not only those elements, but also other elements that are not explicitly listed, or elements inherent to such a process, method, article or device. Without further limitations, the elements defined by the statement "including an . . . ," means that there are further identical elements in the process, method, article, or device that includes that element.

The above embodiments of the present disclosure are numbered merely for description, and do not represent the advantages or disadvantages of the embodiments.

With the description of the above embodiments, those having ordinary skills in the art will clearly understand that the method of the above embodiments can be implemented by software and a necessary general hardware platform, and of course can also be implemented by hardware, but in many cases the former is a preferred embodiment. Based on such an understanding, the technical schemes of the present disclosure essentially or a part thereof that contributing to the existing technology are, in some embodiments, embodied in a form of a software product stored in a non-transitory computer-readable storage medium (e.g., ROM/RAM, magnetic disk, optical disk) including several instructions to cause a terminal (which may be a mobile phone, computer, server, air conditioner, or network device, etc.) to perform the methods described in the various embodiments of the present disclosure.

The embodiments of the present disclosure have been described above with reference to the accompanying drawings, but the present disclosure is not limited to the foregoing embodiments. The foregoing embodiments are merely illustrative but are not limiting the present disclosure. Those having ordinary skills in the art, inspired by the present disclosure, can make various forms of implementations, without departing from the principles of the present disclosure and the protection scopes of the appended claims of the present disclosure. These various forms of implementations are all within the protection scope of the present disclosure.

What is claimed is:

1. A vehicle-mounted Telematics BOX (TBOX), comprising:
  a Microcontroller Unit (MCU) control device, an antenna device and a measurement device, wherein:
    the measurement device is configured to detect an incident wave power and a reflected wave power when the antenna device is in operation, and determine a real-time standing wave ratio at a position where the antenna device locates;
    the MCU control device is configured to communicate with the antenna device and the measurement device, determine an operation state of the antenna device according to the standing wave ratio, and send a control instruction to the antenna device; and
    the antenna device is configured to switch an internal antenna of the antenna device in real time according to the control instruction, and
    wherein the MCU control device is configured to determine an operation state of the antenna device according to the standing wave ratio and sends a control instruction to the antenna device through the following operations:
      determining an operation state of the antenna device according to the standing wave ratio, judging that the antenna device operates abnormally in response to the standing wave ratio being greater than a preset threshold, and sending a control instruction to the antenna device to switch an internal antenna in real time; and
      judging that the antenna device operates normally in response to the standing wave ratio being less than the preset threshold, and sending a control instruction to the antenna device for not switching an internal antenna.

2. The vehicle-mounted TBOX of claim 1, wherein the measurement device comprises a bidirectional coupler, an attenuator, a detector and a comparator, wherein:
  the bidirectional coupler is configured to receive an incident wave power and a reflected wave power when the antenna device is in operation;
  the attenuator is configured to attenuate the incident wave power and reflected wave power received by the bidirectional coupler to obtain an attenuated incident wave signal and a reflected wave signal;
  the detector is configured to detect the attenuated incident wave signal and the reflected wave signal and output detection voltages comprising a forward detection output voltage and a reverse detection output voltage; and the comparator is configured to perform subtraction on the forward detection output voltage and the reverse detection output voltage to obtain a difference between the forward detection output voltage and the reverse detection output voltage, the difference being used to determine the real-time standing wave ratio according to a function relationship between the difference and a reflection coefficient and a function relationship between the reflection coefficient and the standing wave ratio.

3. The vehicle-mounted TBOX of claim 2, wherein the function relationship between the difference and the reflection coefficient is:

$$\Delta V = 0.51 \; g \frac{10^{\frac{D}{10}} + \Gamma^2}{10^{\frac{D}{10}*\Gamma^2} + 1};$$

wherein D represents a directivity of the bidirectional coupler, $\Gamma$ represents the reflection coefficient, and $\Delta V$ represents the difference between the forward detection output voltage and the reverse detection output voltage.

4. The vehicle-mounted TBOX of claim 2, wherein the function relationship between the reflection coefficient and the standing wave ratio is:

$$VSWR = \frac{1 + |\Gamma|}{1 - |\Gamma|};$$

wherein $\Gamma$ represents the reflection coefficient and VSWR represents the standing wave ratio.

5. The vehicle-mounted TBOX of claim 1, wherein the antenna device comprises a first antenna, a second antenna and an antenna switching switch, wherein:
each of the first antenna and the second antenna is configured to radiate and receive a signal; the first antenna is a vehicle-mounted TBOX default antenna, and the second antenna is a standby antenna; and
the antenna switching switch is configured to control a switching between the first antenna and the second antenna according to the control instruction of the MCU control device, wherein the first antenna is switched to the second antenna in response to the first antenna operating abnormally, and no switching is performed in response to the first antenna operating normally.

6. The vehicle-mounted TBOX of claim 1, further comprising a vehicle-mounted dedicated interface configured for interconnection and communication.

7. The vehicle-mounted TBOX of claim 6, further comprising a wireless wide area network (WWAN) communication module connected with the antenna device, the MCU control device and the vehicle-mounted dedicated interface, and configured for wireless communication of the vehicle-mounted TBOX.

8. A real-time antenna switching method for a vehicle-mounted Telematics BOX (TBOX), applied to a vehicle-mounted TBOX, wherein:
the vehicle-mounted TBOX comprises:
a Microcontroller Unit (MCU) control device, an antenna device and a measurement device, wherein:
the measurement device is configured to detect an incident wave power and a reflected wave power when the antenna device is in operation, and determine a real-time standing wave ratio at a position where the antenna device locates;
the MCU control device is configured to communicate with the antenna device and the measurement device, determine an operation state of the antenna device according to the standing wave ratio, and send a control instruction to the antenna device; and
the antenna device is configured to switch an internal antenna of the antenna device in real time according to the control instruction;
the real-time antenna switching method comprises:
detecting, when the antenna device is in operation, an incident wave power and a reflected wave power, and determining a real-time standing wave ratio at a position where the antenna device locates;
determining an actual operation state of the antenna device according to the standing wave ratio, and sending a control instruction to the antenna device to switch an internal antenna in real time; and
switching an internal antenna of the antenna device in real time, by the antenna device, according to the control instruction,
wherein determining an actual operation state of the antenna device according to the standing wave ratio and sending a control instruction to the antenna device to perform real-time switching of an internal antenna comprises:
determining an operation state of the antenna device according to the standing wave ratio, judging that the antenna device operates abnormally in response to the standing wave ratio being greater than a preset threshold, and sending a control instruction to the antenna device to perform real-time switching of an internal antenna; and
judging that the antenna device operates normally in response to the standing wave ratio being less than the preset threshold, and sending a control instruction to the antenna device so as to not switch an internal antenna.

9. The method of claim 8, wherein detecting an incident wave power and a reflected wave power when the antenna device is in operation, and determining a real-time standing wave ratio at a position where the antenna device locates comprises:
receiving an incident wave power and a reflected wave power when the antenna device is in operation;
attenuating the received incident wave power and reflected wave power to obtain an attenuated incident wave signal and a reflected wave signal;
detecting the attenuated incident wave signal and the reflected wave signal and outputting output detection voltages including a forward detection output voltage and a reverse detection output voltage; and
performing subtraction on the forward detection output voltage and the reverse detection output voltage to obtain a difference between the forward detection output voltage and the reverse detection output voltage; and
determining, according to the difference, the real-time standing wave ratio according to a function relationship between the difference and a reflection coefficient and a function relationship between the reflection coefficient and the standing wave ratio.

10. The method of claim 9, wherein the function relationship between the difference and the reflection coefficient is:

$$\Delta V = 0.51 \lg \frac{10^{\frac{D}{10}} + \Gamma^2}{10^{\frac{D}{10} * \Gamma^2} + 1};$$

wherein D represents a directivity of the bidirectional coupler, Γ represents the reflection coefficient, and ΔV represents the difference between the forward detection output voltage and the reverse detection output voltage.

11. The method of claim 9, wherein the function relationship between the reflection coefficient and the standing wave ratio is:

$$VSWR = \frac{1 + |\Gamma|}{1 - |\Gamma|};$$

wherein Γ represents the reflection coefficient and VSWR represents the standing wave ratio.

12. The method of claim 8, wherein the antenna device comprises a first antenna, a second antenna and an antenna switching switch, each of the first antenna and the second antenna is configured to radiate and receive a signal;
the first antenna is a vehicle-mounted TBOX default antenna, and the second antenna is a standby antenna; and
wherein the method comprises:
controlling a switching between the first antenna and the second antenna via the antenna switching switch according to the control instruction of the MCU control device, and switching the first antenna to the second antenna in response to the first antenna operating abnormally, and no switching is performed in response to the first antenna operating normally.

13. A vehicle-mounted Telematics BOX (TBOX) apparatus, comprising: a memory, a processor, and a computer program stored in the memory and executable by the processor, wherein the computer program, when executed by the processor, cause the processor to perform a real-time antenna switching method, applied to a vehicle-mounted TBOX, wherein:
the vehicle-mounted TBOX comprises:
a Microcontroller Unit (MCU) control device, an antenna device and a measurement device, wherein:
the measurement device is configured to detect an incident wave power and a reflected wave power when the antenna device is in operation, and determine a real-time standing wave ratio at a position where the antenna device locates;
the MCU control device is configured to communicate with the antenna device and the measurement device, determine an operation state of the antenna device according to the standing wave ratio, and send a control instruction to the antenna device; and
the antenna device is configured to switch an internal antenna of the antenna device in real time according to the control instruction;
the real-time antenna switching method comprises:
detecting, when the antenna device is in operation, an incident wave power and a reflected wave power, and determining a real-time standing wave ratio at a position where the antenna device locates;
determining an actual operation state of the antenna device according to the standing wave ratio, and sending a control instruction to the antenna device to switch an internal antenna in real time; and
switching an internal antenna of the antenna device in real time, by the antenna device, according to the control instruction,
wherein determining an actual operation state of the antenna device according to the standing wave ratio and sending a control instruction to the antenna device to perform real-time switching of an internal antenna comprises:
determining an operation state of the antenna device according to the standing wave ratio, judging that the antenna device operates abnormally in response to the standing wave ratio being greater than a preset threshold, and sending a control instruction to the antenna device to perform real-time switching of an internal antenna; and
judging that the antenna device operates normally in response to the standing wave ratio being less than the preset threshold, and sending a control instruction to the antenna device so as to not switch an internal antenna.

14. A non-transitory computer-readable storage medium storing a program of an antenna real-time switching method for a vehicle-mounted Telematics BOX (TBOX), which, when executed by a processor, cause the processor to perform a real-time antenna switching method, applied to a vehicle-mounted TBOX, wherein:
the vehicle-mounted TBOX comprises:
a Microcontroller Unit (MCU) control device, an antenna device and a measurement device, wherein:
the measurement device is configured to detect an incident wave power and a reflected wave power when the antenna device is in operation, and determine a real-time standing wave ratio at a position where the antenna device locates;
the MCU control device is configured to communicate with the antenna device and the measurement device, determine an operation state of the antenna device according to the standing wave ratio, and send a control instruction to the antenna device; and
the antenna device is configured to switch an internal antenna of the antenna device in real time according to the control instruction;
the real-time antenna switching method comprises:
detecting, when the antenna device is in operation, an incident wave power and a reflected wave power, and determining a real-time standing wave ratio at a position where the antenna device locates;
determining an actual operation state of the antenna device according to the standing wave ratio, and sending a control instruction to the antenna device to switch an internal antenna in real time; and
switching an internal antenna of the antenna device in real time, by the antenna device, according to the control instruction,
wherein determining an actual operation state of the antenna device according to the standing wave ratio and sending a control instruction to the antenna device to perform real-time switching of an internal antenna comprises:
determining an operation state of the antenna device according to the standing wave ratio, judging that the antenna device operates abnormally in response to the standing wave ratio being greater than a preset threshold, and sending a control instruction to the antenna device to perform real-time switching of an internal antenna; and judging that the antenna device operates normally in response to the standing wave ratio being less than the preset threshold, and sending a control instruction to the antenna device so as to not switch an internal antenna.

\* \* \* \* \*